United States Patent [19]
Wessner

[11] Patent Number: 5,951,080
[45] Date of Patent: Sep. 14, 1999

[54] GAME CARRYING DEVICE

[76] Inventor: Kurt H. Wessner, 253 S. Main St., Pine Grove, Pa. 17963

[21] Appl. No.: 09/160,173

[22] Filed: Sep. 25, 1998

[51] Int. Cl.⁶ .................................................. B65D 63/18
[52] U.S. Cl. ........................... 294/153; 294/150; 294/165
[58] Field of Search .............................. 294/15, 26, 31.2, 294/74, 141, 142, 149–151, 153, 156, 158, 165; 24/16 R, 16 PB, 17 R, 17 A, 17 AP, 115 H, 129 R, 135 R, 135 N, 136 R; 119/807; 224/103; 452/185, 187, 189

[56] References Cited

U.S. PATENT DOCUMENTS

| | | | |
|---|---|---|---|
| 2,819,923 | 1/1958 | Anderson | 294/150 X |
| 4,091,976 | 5/1978 | Morse | 294/153 X |
| 4,243,164 | 1/1981 | Burlison et al. | 294/165 X |
| 4,529,240 | 7/1985 | Engel | 294/165 X |
| 4,696,505 | 9/1987 | Shadoan | 294/153 |
| 5,042,114 | 8/1991 | Parrish | 294/153 X |
| 5,240,300 | 8/1993 | Ramsey | 294/153 |
| 5,697,660 | 12/1997 | Smetz | 294/141 X |

Primary Examiner—Johnny D. Cherry

[57] ABSTRACT

A game carrying device for carrying game animals, especially through rough terrain such as woods or fields. The device includes a handle member with proximal and distal ends, a central opening therethrough. The proximal end of the handle member and the central opening define therebetween a gripping portion on the handle member designed for grasping by a hand of a user. The handle member has a bore therethrough extending between the distal end of the handle member and the central opening. A first end of an elongate flexible member is coupled to the distal end of the handle member. A second end of the flexible member is extended through the bore of the handle member from the distal end of the handle and into the central opening such that the flexible member forms a loop outwardly extending from the distal end of the handle member. The loop of the flexible member is designed for extending a limb of a game animal therethrough.

12 Claims, 3 Drawing Sheets

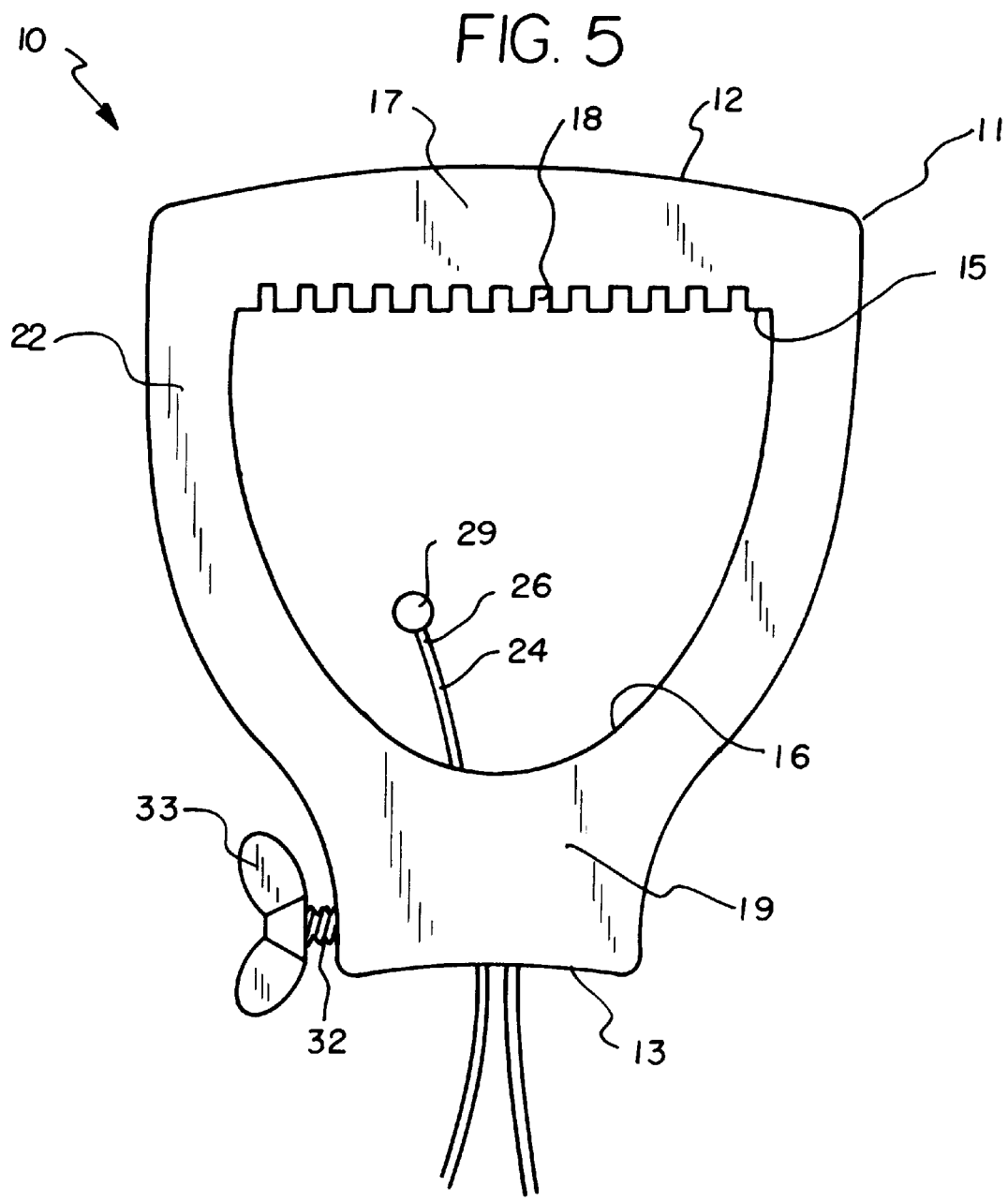

GAME CARRYING DEVICE

BACKGROUND OF THE INVENTION

1. Field of the Invention

The present invention relates to devices for carrying and dragging game animals and more particularly pertains to a new game carrying device for carrying game animals, especially through rough terrain such as woods or fields.

2. Description of the Prior Art

The use of devices for carrying and dragging game animals is known in the prior art. More specifically, devices for carrying and dragging game animals heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,243,164; U.S. Pat. No. 5,382,064; U.S. Pat. No. 5,316,356; U.S. Pat. No. 3,188,130; U.S. Pat. No. 1,640,102; and U.S. Pat. No. Des. 312,164.

While these devices fulfill their respective, particular objectives and requirements, the aforementioned patents do not disclose a new game carrying device. The inventive device includes a handle member with proximal and distal ends, a central opening therethrough. The proximal end of the handle member and the central opening define therebetween a gripping portion on the handle member designed for grasping by a hand of a user. The handle member has a bore therethrough extending between the distal end of the handle member and the central opening. A first end of an elongate flexible member is coupled to the distal end of the handle member. A second end of the flexible member is extended through the bore of the handle member from the distal end of the handle and into the central opening such that the flexible member forms a loop outwardly extending from the distal end of the handle member. The loop of the flexible member is designed for extending a limb of a game animal therethrough.

In these respects, the game carrying device according to the present invention substantially departs from the conventional concepts and designs of the prior art, and in so doing provides an apparatus primarily developed for the purpose of carrying game animals, especially through rough terrain such as woods or fields.

SUMMARY OF THE INVENTION

In view of the foregoing disadvantages inherent in the known types of devices for carrying and dragging game animals now present in the prior art, the present invention provides a new game carrying device construction wherein the same can be utilized for carrying game animals, especially through rough terrain such as woods or fields.

The general purpose of the present invention, which will be described subsequently in greater detail, is to provide a new game carrying device apparatus and method which has many of the advantages of the devices for carrying and dragging game animals mentioned heretofore and many novel features that result in a new game carrying device which is not anticipated, rendered obvious, suggested, or even implied by any of the prior art devices for carrying and dragging game animals, either alone or in any combination thereof.

To attain this, the present invention generally comprises a handle member with proximal and distal ends, a central opening therethrough. The proximal end of the handle member and the central opening define therebetween a gripping portion on the handle member designed for grasping by a hand of a user. The handle member has a bore therethrough extending between the distal end of the handle member and the central opening. A first end of an elongate flexible member is coupled to the distal end of the handle member. A second end of the flexible member is extended through the bore of the handle member from the distal end of the handle and into the central opening such that the flexible member forms a loop outwardly extending from the distal end of the handle member. The loop of the flexible member is designed for extending a limb of a game animal therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new game carrying device apparatus and method which has many of the advantages of the devices for carrying and dragging game animals mentioned heretofore and many novel features that result in a new game carrying device which is not anticipated, rendered obvious, suggested, or even implied by any of the prior art devices for carrying and dragging game animals, either alone or in any combination thereof.

It is another object of the present invention to provide a new game carrying device which may be easily and efficiently manufactured and marketed.

It is a further object of the present invention to provide a new game carrying device which is of a durable and reliable construction.

An even further object of the present invention is to provide a new game carrying device which is susceptible of a low cost of manufacture with regard to both materials and labor, and which accordingly is then susceptible of low prices of sale to the consuming public, thereby making such game carrying device economically available to the buying public.

Still yet another object of the present invention is to provide a new game carrying device which provides in the apparatuses and methods of the prior art some of the advantages thereof, while simultaneously overcoming some of the disadvantages normally associated therewith.

Still another object of the present invention is to provide a new game carrying device for carrying game animals, especially through rough terrain such as woods or fields.

Yet another object of the present invention is to provide a new game carrying device which includes a handle member with proximal and distal ends, a central opening therethrough. The proximal end of the handle member and the central opening define therebetween a gripping portion on the handle member designed for grasping by a hand of a user. The handle member has a bore therethrough extending between the distal end of the handle member and the central opening. A first end of an elongate flexible member is coupled to the distal end of the handle member. A second end of the flexible member is extended through the bore of the handle member from the distal end of the handle and into the central opening such that the flexible member forms a loop outwardly extending from the distal end of the handle member. The loop of the flexible member is designed for extending a limb of a game animal therethrough.

Still yet another object of the present invention is to provide a new game carrying device that can be quickly and easily secured to a limb of a game animal and also quickly and easily removed from the limb of the game animal.

Even still another object of the present invention is to provide a new game carrying device that can also be used to carrying other items such as bundles of firewood, lumber, and pipes.

Even yet still another object of the present invention is to provide a new game carrying device that can also be used to pull boats out of the water.

Still even yet another object of the present invention is to provide a new game carrying device that can also be used to hang garbage bags above the ground at a campsite to prevent animals from gaining access to the garbage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic side view of the second face of the present invention.

DESCRIPTION OF THE PREFERRED EMBODIMENT

Figure 1:
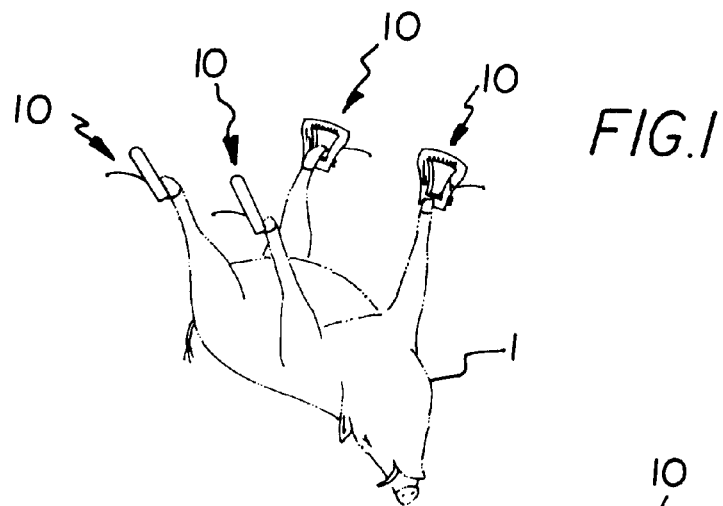
FIG. 1 is a schematic perspective view of a new game carrying device in use carrying a game animal according to the present invention.
Figure 2:
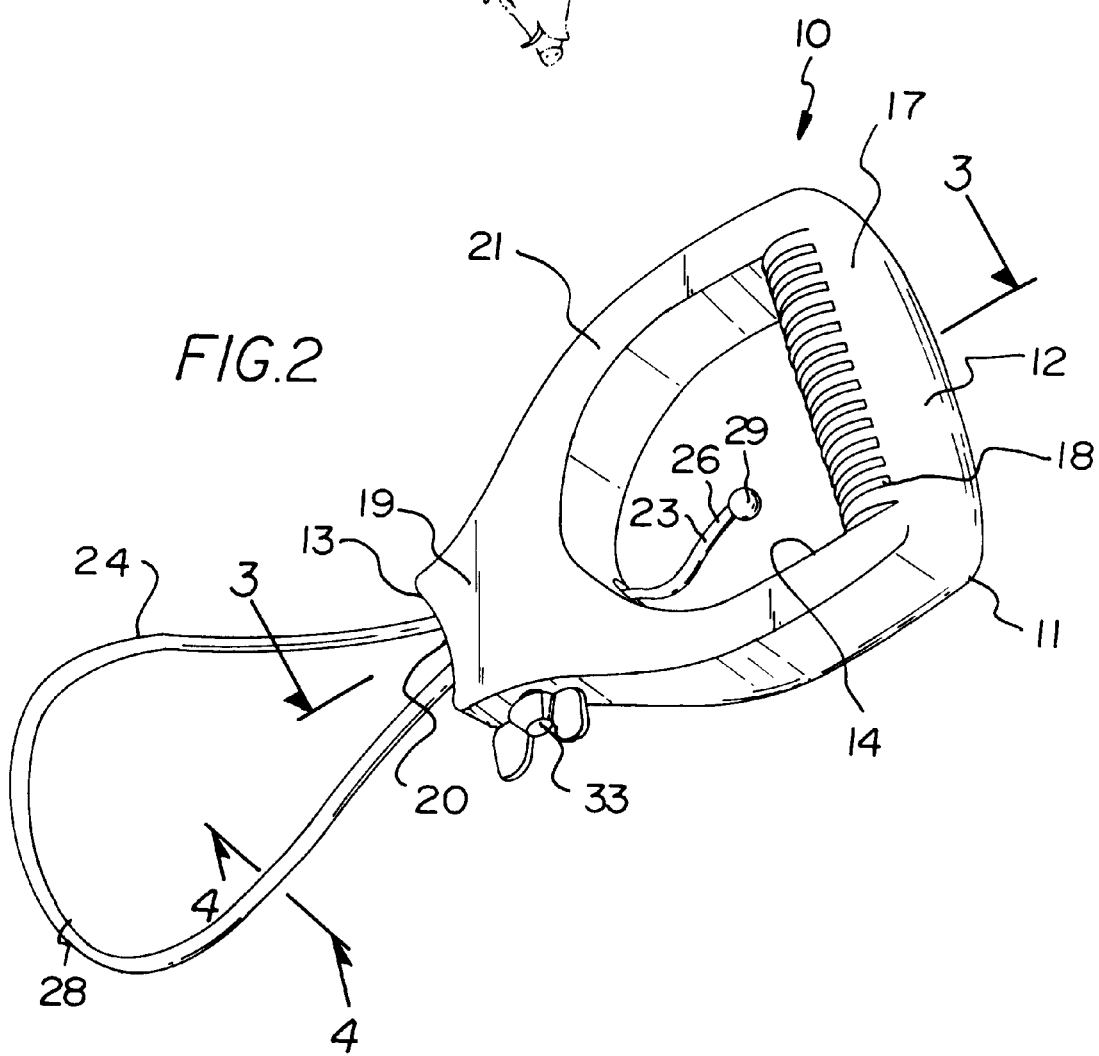
FIG. 2 is a schematic perspective view of the first face of the present invention.

With reference now to the drawings, and in particular to FIGS. 1 through 5 thereof, a new game carrying device embodying the principles and concepts of the present invention and generally designated by the reference numeral 10 will be described.

As best illustrated in FIGS. 1 through 5, the game carrying device 10 generally comprises a handle member 11 with proximal and distal ends 12,13, a central opening 14 therethrough. The proximal end 12 of the handle member 11 and the central opening 14 define therebetween a gripping portion 17 on the handle member 11 designed for grasping by a hand of a user. The handle member 11 has a bore 23 therethrough extending between the distal end 13 of the handle member 11 and the central opening 14. A first end 25 of an elongate flexible member 24 is coupled to the distal end 13 of the handle member 11. A second end 26 of the flexible member 24 is extended through the bore 23 of the handle member 11 from the distal end 13 of the handle and into the central opening 14 such that the flexible member 24 forms a loop 28 outwardly extending from the distal end 13 of the handle member 11. The loop 28 of the flexible member 24 is designed for extending a limb of a game animal 1 therethrough.

In closer detail, the handle member 11 has proximal and distal ends 12,13, a central opening 14 therethrough, and a longitudinal axis extending between the proximal and distal ends 12,13 of the handle member 11. The handle member 11 has a generally open D-shape configuration such that the central opening 14 of the handle member 11 has a corresponding generally D-shaped outer periphery. The outer periphery of the central opening 14 has an elongate proximal portion 15 and an arcuate distal portion 16. The elongate proximal portion 15 is positioned towards the proximal end 12 of the handle member 11. The arcuate distal portion 16 is positioned towards the distal end 13 of the handle member 11 and has a concavity facing towards the proximal end 12 of the handle member 11.

The proximal end 12 of the handle member 11 and elongate proximal portion 15 of the outer periphery of the central opening 14 define therebetween a gripping portion 17 on the handle member 11 designed for grasping by a hand of a user. The gripping portion 17 of the handle member 11 has a plurality of grooves 18 therein for aiding the grip of the user grasping the gripping portion 17. The grooves 18 are arranged in a row adjacent the elongate proximal portion 15 of the outer periphery of the central opening 14. The grooves 18 are spaced apart at generally equal intervals along the row with the row of grooves 18 having a length extending generally perpendicular to the longitudinal axis of the handle member 11.

The handle member 11 also has an end portion 19 located between the distal end 13 of the handle member 11 and the arcuate portion of the outer periphery of the central opening 14. The end portion 19 of the handle member 11 terminates at an arcuate distal face 20 at the distal end 13 of the handle member 11. The distal face 20 has a concavity facing outwards from the distal end 13 of the handle member 11. The handle member 11 has opposite first and second faces 21,22 that generally lie in generally parallel planes to one another. The central opening 14 of the handle member 11 extends between the first and second faces 21,22 of the handle member 11. The distal face 20 has a concave cross section taken along a plane generally parallel to the planes of the first and second faces 21,22 of the handle member 11.

The handle member 11 has a bore 23 through the end portion 19 extending between the distal end 13 of the handle member 11 and the arcuate portion of the outer periphery of the central opening 14. The bore has a generally circular transverse cross section defining a diameter for the bore 23.

Figure 3:
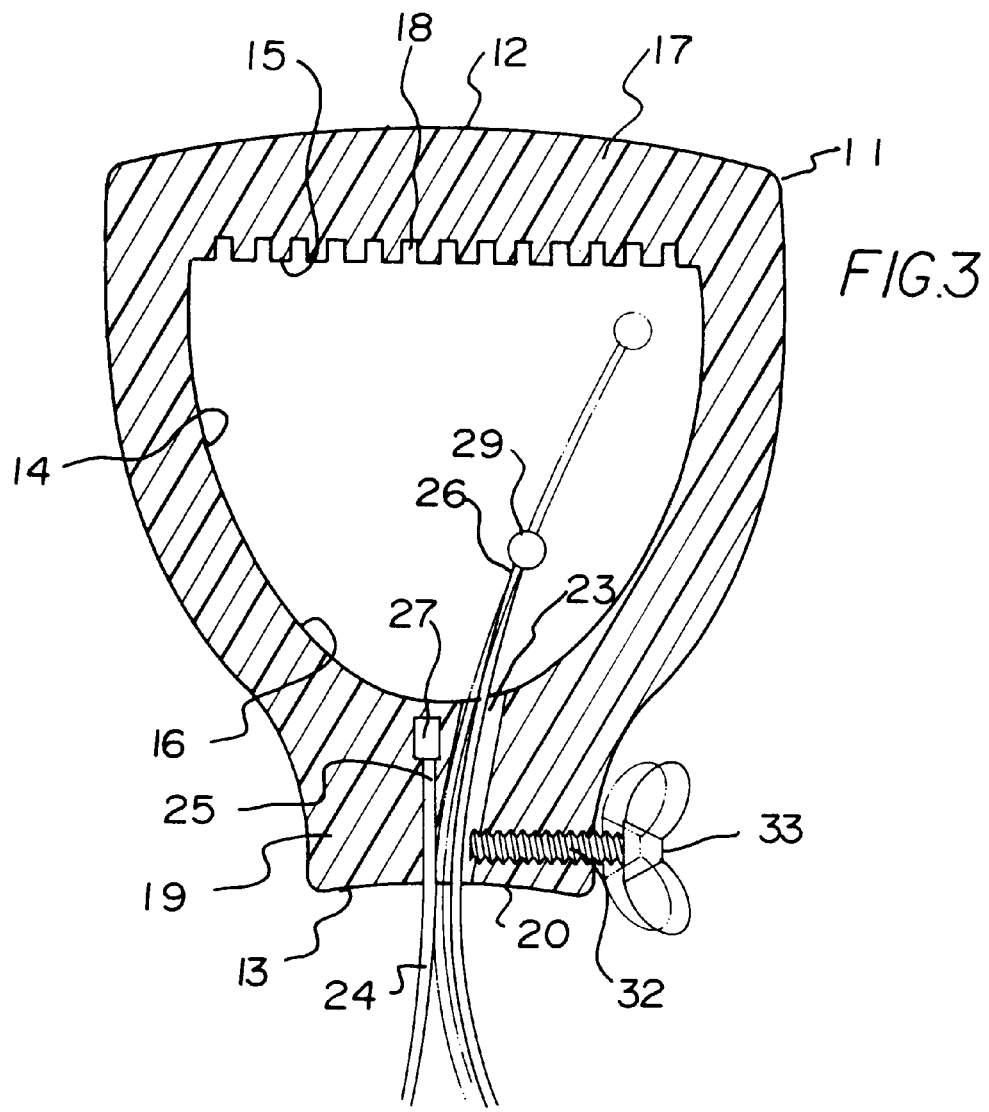
FIG. 3 is a schematic cross sectional view of the present invention taken from line 3—3 of FIG. 2.
Figure 4:
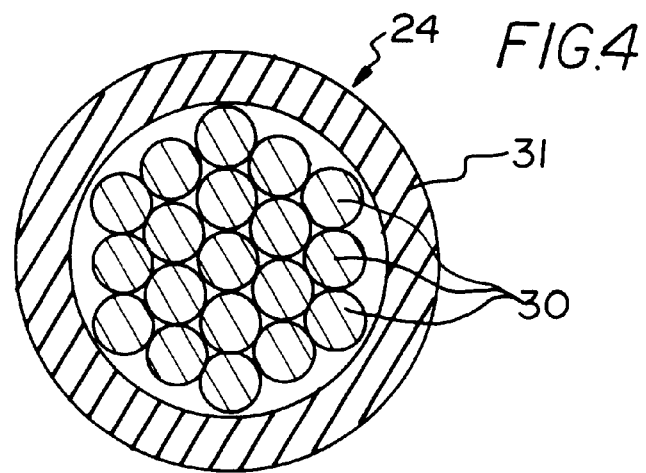
FIG. 4 is a schematic cross sectional view of the flexible member of the present invention taken from line 4—4 of FIG. 2.

The device 10 also includes an elongate flexible member 24 with opposite first and second ends 25,26. The first end 25 of the flexible member 24 is coupled to the distal end 13 of the handle member 11. Preferably, as illustrated in FIG. 3, the first end 25 of the flexible member 24 is inserted into the distal end 13 of the handle member 11 and has an end connector 27 securing the first end 25 of the flexible member 24 in the distal member to prevent pulling out of the first end 25 of the flexible member 24 from the distal end 13 of the handle member 11.

The second end 26 of the flexible member 24 is extended through the bore 23 of the handle member 11 from the distal end 13 of the handle and into the central opening 14 such that the flexible member 24 forms a loop 28 outwardly extending from the distal end 13 of the handle member 11. In use, the loop 28 of the flexible member 24 is designed for extending a limb of a game animal 1 therethrough. The flexible member 24 is slidable through the bore 23 of the handle member 11 to permit increasing and reducing of the size of the loop 28. In use, pulling on the second end 26 of the flexible member 24 reduces the size of the loop 28 to tighten loop 28 of the flexible member 24 around the limb of the game animal 1. Conversely, sliding the flexible member 24 through the bore 23 to bring the second end 26 of the flexible member 24 closer to the bore 23 enlarges the loop 28 to release the limb of the game animal 1 from the loop 28. The second end 26 of the flexible member 24 has a stopper 29 sized greater than the bore 23 of the handle member 11 such that second end 26 of flexible member 24 cannot pass through the bore 23 of the handle member 11. Preferably, the stopper 29 is generally spherical and has a diameter greater than the diameter of the bore 23 of the handle member 11.

The flexible member 24 preferably comprises a plurality of elongate flexible metal cables 30 encased in a flexible resiliently deformable rubber sheath 31 for providing sufficient strength for carrying a game animal 1 while not cutting into the limb of the animal 1.

A holding device is provided for releasably holding the flexible member 24 in a fixed position in the bore 23 of the handle. Preferably, the holding device comprises a threaded fastener 32 threadably extending through a threaded hole in a side of the handle member 11 into the bore 23 to hold a portion of the flexible member 24 between an end of the threaded fastener 32 and a portion of a side wall of the bore 23 of the handle member 11. The threaded fastener 32 has a turning head 33 outwardly extending from the handle member 11; the turning head 33 has a pair of turning wings to permit turning of the threaded fastener 32 to advance and retract the threaded fastener 32 from the threaded hole.

In an ideal illustrative embodiment, the handle member 11 has a length defined between the proximal and distal ends 12,13 of the handle member 11 of about 6½ inches, an outer width defined generally perpendicular to the length of the housing of about 4½ inches, and a thickness defined between the first and second faces 21,22 of about 1½ inches.

In use, the device 10 is designed for attachment to a limb of a game animal 1 for aiding the carrying of the game animal 1 so that the fur or pelt of the animal is not damaged from the dragging of the animal on the ground. A device 10 should be provided for each limb of the animal and the limbs of the animal should then be extended through the loop of their associated device. The loops are then tightened around the limbs by pulling on the second ends of the flexible members. The loops should be tightened so that the limbs are held to the device by the loop and abut the distal face of the end portion. The curvature of the distal face of the end portion helps hold the limb in place with respect to the device 10. The holding device is then tightened to hold the loop in the tightened position around the limb of the animal. A person then grabs each of the gripping portions of the handle member and lifts the animal with the device so that the animal is suspended above the ground and can be carried to a desired location.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for attachment to a limb of a game animal for aiding the carrying of the game animal, said device comprising:

a handle member having proximal and distal ends, a central opening therethrough;

said proximal end of said handle member and said central opening defining therebetween a gripping portion on said handle member adapted for grasping by a hand of a user;

said handle member having a bore therethrough extending between said distal end of said handle member and said central opening;

an elongate flexible member having opposite first and second ends;

said first end of said flexible member being coupled to said distal end of said handle member; and said second end of said flexible member being extended through said bore of said handle member from said distal end of said handle member and into said central opening such that said flexible member forms a loop outwardly extending from said distal end of said handle member, said loop of said flexible member being adapted for extending a limb of a game animal therethrough.

2. The device of claim 1, wherein said handle member has a generally open D-shape configuration such that said central opening of said handle member has a corresponding generally D-shaped outer periphery, said outer periphery of said central opening having an elongate proximal portion and an arcuate distal portion, said elongate proximal portion of said outer periphery of said central opening being positioned towards said proximal end of said handle member, and said arcuate distal portion of said outer periphery of said central opening being positioned towards said distal end of said handle member and having a concavity facing towards said proximal end of said handle member.

3. The device of claim 1, wherein said gripping portion of said handle member having a plurality of grooves therein for aiding the grip of the user grasping said gripping portion.

4. The device of claim 3, wherein said grooves of said gripping portion are arranged in a row adjacent said central opening, said grooves being spaced apart at generally equal intervals along said row.

5. The device of claim 1, wherein said handle member has an end portion located between said distal end of said handle member and said arcuate portion of said outer periphery of said central opening, said end portion of said handle member terminating at an arcuate distal face at said distal end of said handle member, said distal face having a concavity facing outwards from said distal end of said handle member.

6. The device of claim 5, wherein said handle member has first and second faces generally lying in generally parallel planes to one another, said central opening of said handle member extending between said first and second faces of said handle member, wherein said distal face has a concave cross section taken along a plane generally parallel to said planes of said first and second faces of said handle member.

7. The device of claim 1, wherein said bore has a diameter, wherein said second end of said flexible member has a stopper, said stopper being sized greater than said diameter of said bore of said handle member such that said second end of said flexible member cannot pass through said bore of said handle member.

8. The device of claim 7, wherein said stopper is generally spherical and has a diameter greater than said diameter of said bore of said handle member.

9. The device of claim 1, further comprising a holding device for releasably holding said flexible member in a fixed position in said bore of said handle member.

10. The device of claim 9, wherein said holding device comprises a threaded fastener threadably extending through a threaded hole in said handle member into said bore to hold a portion of said flexible member between an end of said threaded fastener and a portion of a side wall of said bore of said handle member.

11. The device of claim 10, wherein said threaded fastener has a turning head outwardly extending from said handle member, said turning head having a pair of turning wings to permit turning of said threaded fastener to advance and retract said threaded fastener from said threaded hole.

12. A device for attachment to a limb of a game animal for aiding the carrying of the game animal, said device comprising:

a handle member having proximal and distal ends, a central opening therethrough, and a longitudinal axis extending between said proximal and distal ends of said handle member;

said handle member having a generally open D-shape configuration such that said central opening of said handle member has a corresponding generally D-shaped outer periphery;

said outer periphery of said central opening having an elongate proximal portion and an arcuate distal portion;

said elongate proximal portion of said outer periphery of said central opening being positioned towards said proximal end of said handle member;

said arcuate distal portion of said outer periphery of said central opening being positioned towards said distal end of said handle member and having a concavity facing towards said proximal end of said handle member;

said proximal end of said handle member and said elongate proximal portion of said outer periphery of said central opening defining therebetween a gripping portion on said handle member adapted for grasping by a hand of a user;

said gripping portion of said handle member having a plurality of grooves therein for aiding the grip of the user grasping said gripping portion;

said grooves of said gripping portion being arranged in a row adjacent said elongate proximal portion of said outer periphery of said central opening, said grooves being spaced apart at generally equal intervals along said row;

said row of grooves having a length extending generally perpendicular to said longitudinal axis of said handle member;

said handle member having an end portion located between said distal end of said handle member and said arcuate portion of said outer periphery of said central opening;

said end portion of said handle member terminating at an arcuate distal face at said distal end of said handle member, said distal face having a concavity facing outwards from said distal end of said handle member;

said handle member having first and second faces generally lying in generally parallel planes to one another, said central opening of said handle member extending between said first and second faces of said handle member;

said distal face having a concave cross section taken along a plane generally parallel to said planes of said first and second faces of said handle member;

said handle member having a bore therethrough extending between said distal end of said handle member and said arcuate portion of said outer periphery of said central opening, said bore having a diameter;

an elongate flexible member having opposite first and second ends;

said first end of said flexible member being coupled to said distal end of said handle member;

said second end of said flexible member being extended through said bore of said handle member from said distal end of said handle member and into said central opening such that said flexible member forms a loop outwardly extending from said distal end of said handle member, said loop of said flexible member being adapted for extending a limb of a game animal therethrough;

said second end of said flexible member having a stopper, said stopper being sized greater than said bore of said handle member such that said second end of said flexible member cannot pass through said bore of said handle member;

wherein said stopper is generally spherical and has a diameter greater than said diameter of said bore of said handle member;

a holding device for releasably holding said flexible member in a fixed position in said bore of said handle member;

wherein said holding device comprises a threaded fastener threadably extending through a threaded hole in said handle member into said bore to hold a portion of said flexible member between an end of said threaded fastener and a portion of a side wall of said bore of said handle member; and said threaded fastener having a turning head outwardly extending from said handle member, said turning head having a pair of turning wings to permit turning of said threaded fastener to advance and retract said threaded fastener from said threaded hole.

* * * * *